(No Model.)
W. H. BORDNER.
MARSH HORSESHOE.
No. 603,675. Patented May 10, 1898.
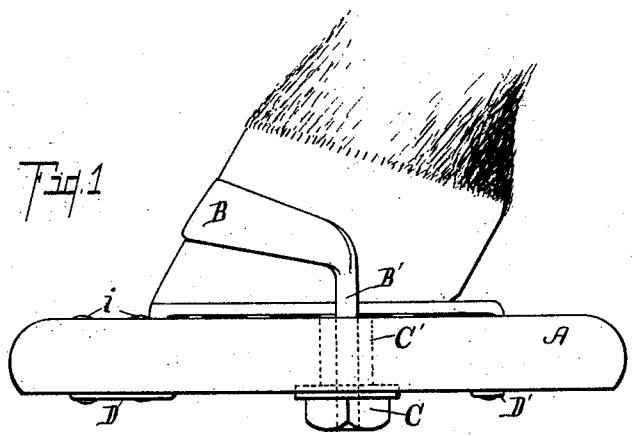
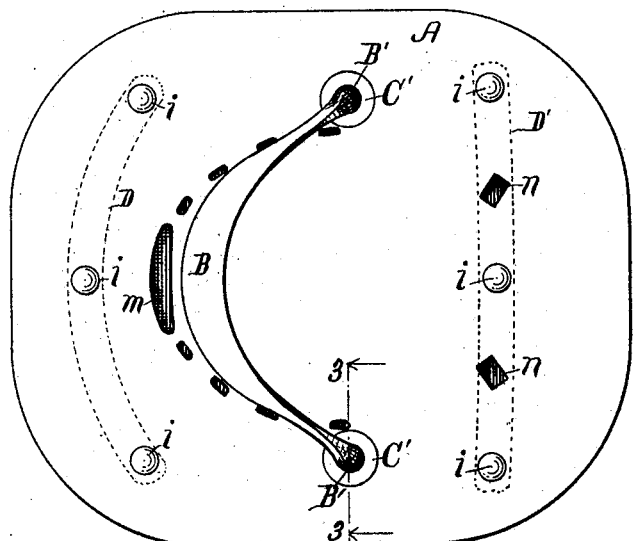
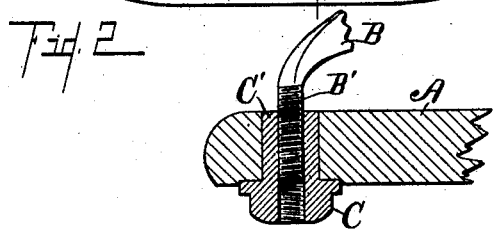
Witnesses.
W. S. Wood
Otis A. Earl
Inventor.
William H. Bordner
By Fred L. Chappell
Attorney.

UNITED STATES PATENT OFFICE.

WILLIAM H. BORDNER, OF BURR OAK, MICHIGAN.

MARSH-HORSESHOE.

SPECIFICATION forming part of Letters Patent No. 603,675, dated May 10, 1898.

Application filed December 21, 1897. Serial No. 662,903. (No model.)

*To all whom it may concern:*

Be it known that I, WILLIAM H. BORDNER, a citizen of the United States, residing at the village of Burr Oak, in the county of St. Joseph and State of Michigan, have invented certain new and useful Improvements in Marsh-Shoes, of which the following is a specification.

This invention relates to improvements in marsh or swamp shoes for horses; and it relates particularly to an improved attaching means for securing the same to the feet of horses, so that the same can be quickly and securely attached and easily detached without danger of the same getting out of order.

All of the objects of this invention will fully appear from the specification.

I accomplish the objects of my invention by the devices and means described in this specification.

The invention is definitely pointed out in the claims.

The device is fully illustrated in the accompanying drawings, forming a part of this specification, in which—

Figure 1 is a side elevation of my improved marsh-shoe attached to a horse's foot. Fig. 2 is a top plan view of my improved marsh-shoe detached from the foot. Fig. 3 is an enlarged detail sectional view on line 3 3 of Fig. 2, looking in the direction of the little arrows at the ends of the section-line.

In the drawings similar letters of reference refer to similar parts throughout the several views.

Referring to the lettered parts of the drawings, A is the plate or shoe, made of a piece of plank or board or any convenient material, considerably larger than the horse's hoof to serve the purpose of enlarging the tread of the hoof to increase the resistance, so that a horse will not settle into marshy ground or will not injure a lawn in traveling over it. Where this plate is made of a plank, cleats D D', preferably of iron, are secured to it on the under side by bolts or rivets *i i i*. This prevents the weight of the animal above from splitting the plank and also prevents the board or plank from warping and answers for calks to prevent the pontoon from slipping on soft wet earth.

Suitable depressions *m* and *n n* are formed to receive the toe and heel calks of the horseshoe. Depressions will be formed in the plank by the nails of the horseshoe, as indicated. Where the structure is made of metal, these impressions should be formed to increase the hold of the shoe upon the same, though they are not an absolute necessity. A clamp B, flattened and conformed above and extending forwardly, engages the upper side of the horse's hoof. The rear portions B' of the clamp are vertical and extend down through the plate or shoe A and are screw-threaded. These are engaged by threaded nuts C. The nuts C are shouldered on the outside and have shanks C' extending up through the plank or plate A. This structure protects the ends of the bolt, so that it is not necessary in tightening over the horse's hoof to draw it so far down that any of the bolt projects, which would be liable to injury and to be bent by the horse traveling on the same. This also prevents the danger of horses calking themselves or one another while in the act of turning around. By constructing the nut and bolt in this way the same can be readily loosened and the shoe removed without entirely detaching the remaining clamp B, the advantages of which must be apparent to any one.

In use the foot of the horse on which the marsh-shoe is to be used is placed so that the toe and heel calks engage in the depressions *m* and *n n* to prevent the slipping of the foot on the same. Then the nuts C are turned, and the clamp B is drawn down tight on the hoof and retains the same securely. When it is desired to remove this improved marsh-shoe, the nuts C are merely loosened, which enables the shoe to be removed without separating the parts. In this connection it is well to remark that the clamp with the ends constructed as I have described secures great strength in the fastening.

With any convenient provision to prevent slipping, this shoe may be used on any hoofed animal not wearing iron shoes, and it would be found useful for that purpose. The slipping might be prevented by any well-known means.

Having thus described my invention, what I claim as new, and desire to secure by Letters Patent, is—

1. The combination of a plate or shoe A, with suitable depressions to receive the calks of the horseshoe; a clamp B bent forward to conform to the hoof of an animal and having vertical end portions B' projecting through the shoe or plate A; and screw-threaded nuts C, shouldered and having a shank portion C' fitted in suitable holes in the plate to engage the vertical portion of the clamp, for the purpose specified.

2. The combination of a plate or shoe A, a clamp B bent forward to conform to the hoof of an animal and having vertical end portions B' projecting through the shoe or plate A; and screw-threaded nuts C, shouldered and having a shank portion C' fitted in suitable holes in the plate to engage the vertical portion of the clamp for the purpose specified.

3. The combination of a plate or shoe A; a clamp conformed to the hoof of an animal having vertical end portions projecting through said shoe; screw-threaded nuts C, shouldered and having shanks C' in holes in the plate, and means of preventing a hoof from slipping on the shoe, as specified.

In witness whereof I have hereunto set my hand and seal in the presence of two witnesses.

WILLIAM H. BORDNER. [L. S.]

Witnesses:
ALFRED R. KEESLAR,
PERCIVAL E. CONEY.